United States Patent
Suzuki et al.

(10) Patent No.: US 8,339,012 B2
(45) Date of Patent: Dec. 25, 2012

(54) ELECTRET AND ELECTROSTATIC INDUCTION CONVERSION DEVICE COMPRISING THE SAME

(75) Inventors: Yuji Suzuki, Fuchu (JP); Yoshihiko Sakane, Tokyo (JP)

(73) Assignees: The University of Tokyo, Tokyo (JP); Asahi Glass Co., Ltd., Tokyo (JP)

( * ) Notice: Subject to any disclaimer, the term of this patent is extended or adjusted under 35 U.S.C. 154(b) by 561 days.

(21) Appl. No.: 12/449,928

(22) PCT Filed: Feb. 27, 2008

(86) PCT No.: PCT/JP2008/000359
§ 371 (c)(1),
(2), (4) Date: Sep. 3, 2009

(87) PCT Pub. No.: WO2008/114489
PCT Pub. Date: Sep. 25, 2008

(65) Prior Publication Data
US 2010/0127595 A1    May 27, 2010

(30) Foreign Application Priority Data

Mar. 22, 2007 (JP) .................................. 2007-075191
Nov. 22, 2007 (JP) .................................. 2007-303041

(51) Int. Cl.
*H02N 11/00* (2006.01)
(52) U.S. Cl. ......................... 310/300; 524/544; 525/104
(58) Field of Classification Search .................. 310/300; 524/544; 525/104
See application file for complete search history.

(56) References Cited

U.S. PATENT DOCUMENTS

| | | | | | |
|---|---|---|---|---|---|
| 3,481,815 | A | * | 12/1969 | Barrty et al. | 156/329 |
| 4,642,504 | A | * | 2/1987 | Jacobsen | 310/308 |
| 6,794,027 | B1 | | 9/2004 | Araki et al. | |
| 2006/0113862 | A1 | * | 6/2006 | Suzuki et al. | 310/309 |

FOREIGN PATENT DOCUMENTS

| | | | |
|---|---|---|---|
| JP | -04-189880 | * | 7/1992 |
| JP | A-4-189880 | | 7/1992 |
| JP | A-5-155936 | | 6/1993 |
| JP | A-2004-128361 | | 4/2004 |
| JP | A-2006-180450 | | 7/2006 |
| WO | WO 00/11093 A1 | | 3/2000 |

OTHER PUBLICATIONS

First Office Action for Chinese Patent Application No. 200880008793.4, dated Mar. 8, 2011 (w/ English translation).
Office Action issued in Japanese Patent Application No. 2007-303041 dated Aug. 9, 2011 (with translation).
Office Action issued in Japanese Patent Application No. 2007-303041 dated Oct. 25, 2011 (with translation).
Office Action issued in Russian Patent Application No. 2009-138001/07(053775) dated Dec. 9, 2011 (with translation).

* cited by examiner

*Primary Examiner* — Peter D. Mulcahy
*Assistant Examiner* — Henry Hu
(74) *Attorney, Agent, or Firm* — Oliff & Berridge, PLC

(57) ABSTRACT

To provide an electret whose surface potential is improved and an electrostatic induction conversion device comprising the same, an electret is formed by spin-coating a fluorine-containing polymer composition for coating which contains a fluorine-containing polymer having a ring structure in its main chain, a silane coupling agent, an aprotic fluorine-containing solvent, and a fluorine-containing alcohol as a protic fluorine-containing solvent on a copper substrate and baking it.

10 Claims, 7 Drawing Sheets

ELECTRET AND ELECTROSTATIC INDUCTION CONVERSION DEVICE COMPRISING THE SAME

BACKGROUND

1. Technical Field

The present invention relates to the improvement of an electret and an electrostatic induction conversion device comprising the same.

2. Related Art

Conventionally, electrostatic induction conversion devices such as a power generator or a microphone using an electret in which an electric charge is injected in an insulating material have been proposed. For example, a fluorine-containing polymer described in Patent Document 1 as below can be used as a material of the electret.

Patent Document 1: Japanese Patent Application Laid-Open (JP-A) No. 4-189880

However, when the conventional fluorine-containing polymer is used, the density of charges to be injected into an electret cannot be increased and the surface potential is insufficient. This causes a disadvantage that the conversion efficiency between electric energy and kinetic energy in the electrostatic induction conversion device using the electret cannot be improved.

SUMMARY

The present invention has been made in view of the above conventional problems. An objective of the present invention is to provide an electret whose surface potential is improved and an electrostatic induction conversion device comprising the same.

In order to achieve the above-described objective, an electret according to a first aspect of the invention includes a mixture of a fluorine-containing polymer having a ring structure in its main chain and a silane coupling agent.

According to a second aspect of the invention, the fluorine-containing polymer having a ring structure in its main chain may include a carboxy group as an end group in the electret according to the first aspect of the invention.

According to a third aspect of the invention, the electret according to the first or second aspect of the invention may include a silane compound bonded to a carboxyl group.

According to a fourth aspect of the invention, the fluorine-containing polymer having a ring structure in its main chain may be a fluorine-containing aliphatic polymer having a ring structure in its main chain in the electret according to any of the first to third aspect of the invention.

According to a fifth aspect of the invention, the fluorine-containing polymer having a ring structure in its main chain may be a fluorine-containing aliphatic polymer having a ring structure including an ethereal oxygen atom in its main chain in the electret according to any of the first to fourth aspect of the invention.

An electrostatic induction conversion device according to a sixth aspect of the invention includes the electret according to any of the first to fifth aspect of the invention.

Effect of the Invention

DETAILED DESCRIPTION

Figure 1:
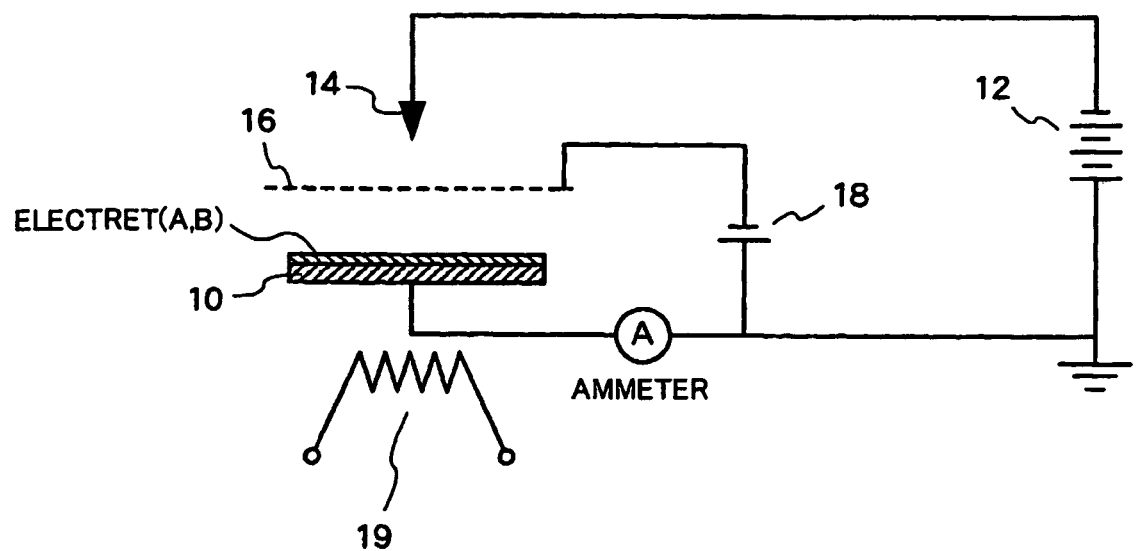
FIG. 1 is a schematic diagram of a corona charging apparatus used in a loading test.

Hereinafter, an exemplary embodiment of the invention (hereinafter referred to as an embodiment) will be described.

According to the embodiment, there is provided an electret formed of a material containing a mixture of a fluorine-containing polymer having a ring structure in its main chain and a silane coupling agent. It is preferable that the fluorine-containing polymer having a ring structure in its main chain includes a carboxy group as an end group. A silane compound may be bonded to the carboxy group.

It is preferable that the fluorine-containing polymer having a ring structure in its main chain is a fluorine-containing aliphatic polymer having a ring structure in its main chain. Further, it is particularly preferable that the polymer is a fluorine-containing aliphatic polymer having a ring structure including an ether oxygen atom in its main chain.

The electret according to the embodiment can be obtained by forming a film of a fluorine-containing polymer composition for coating which contains as essential ingredients the fluorine-containing polymer having a ring structure in its main chain, the silane coupling agent, an aprotic fluorine-containing solvent, and a fluorine-containing alcohol as a protic fluorine-containing solvent. The film formation is performed by, for example, spin-coating the fluorine-containing polymer composition for coating on a copper substrate and baking it.

The electret according to the present embodiment is suitable as the electrostatic induction conversion device, such as an actuator and a sensor, which converts an electric energy into a kinetic energy and a kinetic energy into an electric energy.

Here, the fluorine-containing polymer having a ring structure in its main chain is a polymer soluble in a solvent. An example thereof includes an amorphous perfluoropolymer that is soluble in a fluorine-containing solvent and has a fluorine-containing aliphatic ring structure in its main chain. The fluorine polymer is preferably amorphous, but any fluorine polymer may be used as long as the crystallinity is 30% or less, preferably 20% or less.

Specific examples of the amorphous perfluoropolymer include a cyclic polymer obtained by cyclopolymerization of $CF_2=CFO(CF_2)_nCF=CF_2$ (n=1-3); and homopolymers or copolymers of perfluoro(2,2-dimethyl-1,3-dioxol), perfluoro(1,3-dioxol) or perfluoro(4-methoxy-1,3-dioxol) and so on. A copolymer using two or more monomers thereof is also preferable. Further, a copolymer with fluoroolefin, such as tetrafluoroethylene, chlorotrifluoroethylene and vinylidene fluoride is also preferable. In the cyclopolymerization, homopolymerization, and copolymerization, a conventionally known method disclosed in JP-A No. 4-18988, for example, can be applied.

Further, examples of the aprotic fluorine-containing solvent that dissolves the fluorine-containing polymer having a ring structure in its main chain include the followings:

polyfluoroaromatic compounds such as perfluorobenzene, pentafluorobenzene, 1,3-bis(trifluoromethyl)benzene or 1,4-bis(trifluoromethyl)benzene; polyfluorotrialkylamine compounds such as perfluorotributylamine or perfluorotripropylamine; polyfluorocycloalkane compounds such as perfluorodecalin, perfluorocyclohexane or perfluoro(1,3,5-trimethylcyclohexane); polyfluorocyclic ether compounds such as perfluoro(2-butyltetrahydrofuran); a fluorine-containing low molecular weight polyether;

polyfluoroalkane compounds such as perfluorohexane, perfluorooctane, perfluorodecane, perfluorododecane, perfluoro(2,7-dimethyloctane), 1,1,2-trichloro-1,2,2-trifluoroethane, 1,1,1-trichloro-2,2,2-trifluoroethane, 1,3-dichloro-1,1,2,2,3-pentafluoropropane, 1,1,1,3-tetrachloro-2,2,3,3-tetrafluoropropane, 1,1,3,4-tetrachloro-1,2,2,3,4,4-hexafluorobutane, perfluoro(1,2-dimethylhexane), perfluoro (1,3-dimethylhexane), 2H,3H-perfluoropentane, 1H-perfluorohexane, 1H-perfluorooctane, 1H-perfluorodecane, 1H,1H,1H,2H,2H-perfluorohexane, 1H,1H,1H,2H,2H-perfluorooctane, 1H,1H,1H,2H,2H-perfluorodecane, 3H,4H-perfluoro-2-methylpentane, 2H,3H-perfluoro-2-methylpentane, 1H-1,1-dichloroperfluoropropane or 1H-1,3-dichloroperfluoropropane.

These aprotic fluorine-containing solvents may be used alone or as a mixture. In addition to these, a wide range of compounds may be used. For example, a fluorine-containing solvent such as hydrofluoroether (HFE) is preferable. The fluorine-containing solvent is a fluorine-containing solvent represented by a general formula of $R^1—O—R^2$ (where $R^1$ is a linear or branched polyfluoroalkyl group having 5 to 12 carbon atoms which may have an ether bond and $R^2$ is a linear or branched alkyl group having 1 to 5 carbon atoms).

When the carbon number of $R^1$ is 4 or less, it is difficult to dissolve a polymer having a fluorine-containing ring structure, while, when the carbon number of $R^1$ is 13 or more, it is industrially difficult to obtain the solvent. Therefore, the carbon number of $R_1$ is selected from a range of 5 to 12. The carbon number of $R^1$ is preferably 6 to 10, more preferably 6 to 7 and 9 to 10.

The polyfluoroalkyl group is a group in which two or more hydrogen atoms of the alkyl group is substituted by fluorine atoms. Examples thereof include a perfluoroalkyl group in which all hydrogen atoms of the alkyl group are substituted by fluorine atoms and a group in which two or more hydrogen atoms of the alkyl group are substituted by fluorine atoms and one or more hydrogen atoms of the alkyl group are substituted by halogen atoms other than a fluorine atom. A chlorine atom is preferable as a halogen atom other than the fluorine atom.

In the polyfluoroalkyl group, 60% or more of the hydrogen atoms are preferably substituted by the fluorine atoms in terms of the number of the hydrogen atoms of the corresponding alkyl group, more preferably 80% or more. The polyfluoroalkyl group is further preferably the perfluoroalkyl group.

In the case where $R^1$ has an ether bond, the solubility is inhibited when the number of ether bonds is excessively large. Therefore, the number of the ether bonds in $R^1$ is preferably 1 to 3, more preferably 1 to 2. When the carbon number of $R^2$ is 6 or more, the solubility of the polymer having a fluorine-containing ring structure is significantly inhibited. Preferable examples of $R^2$ include a methyl group or an ethyl group.

When the molecular weight of the fluorine-containing solvent is too large, the viscosity of the fluorine-containing polymer composition is increased and further the solubility of the polymer having a fluorine-containing ring structure is reduced. Therefore, the molecular weight is preferably 1,000 or less. In order to improve the solubility of the polymer having a fluorine-containing ring structure, the fluorine content of the fluorine-containing solvent is preferably 60 to 80% by weight. Preferable examples of the fluorine-containing solvent include the followings:

$F(CF_2)_5OCH_3$, $F(CF_2)_6OCH_3$, $F(CF_2)_7OCH_3$, $F(CF_2)_8OCH_3$, $F(CF_2)_9OCH_3$, $F(CF_2)_{10}OCH_3$, $H(CF_2)_6OCH_3$, $(CF_3)_2CF(OCH_3)CFCF_2CF_3$, $F(CF_2)_3OCF(CF_3)CF_2OCH_3$, $F(CF_2)_3OCF(CF_3)CF_2OCF(CF_3)CF_2OCH_3$, $F(CF_2)_8OCH_2CH_2CH_3$, $(CF_3)_2CFCF_2CF_2OCH_3$ and $F(CF_2)_2O(CF_2)_4OCH_2CH_3$.

Among these fluorine-containing solvents, $(CF_3)_2CF(OCH_3)CFCF_2CF_3$ is particularly preferable.

Examples of the silane coupling agent include the followings, over a wide range including conventionally-known or well-known agents:

monoalkoxysilanes such as trimethylmethoxysilane, trimethylethoxysilane, dimethylvinylmethoxysilane or dimethylvinylethoxysilane;

dialkoxysilanes such as γ-chloropropylmethyldimethoxysilane, γ-chloropropylmethyldiethoxysilane, γ-aminopropylmethyldiethoxysilane, γ-aminopropylmethyldimethoxysilane, N-(β-aminoethyl)-γ-aminopropylmethyldimethoxysilane, N-(β-aminoethyl)-γ-aminopropylmethyldiethoxysilane, γ-glycidyloxypropylmethyldimethoxysilane, γ-glycidyloxypropylmethyldiethoxysilane, γ-methacryloyloxypropylmethyldimethoxysilane, methyldimethoxysilane, methyldiethoxysilane, dimethyldimethoxysilane, dimethyldiethoxysilane, methylvinyldimethoxysilane, methylvinyldiethoxysilane, diphenyldimethoxysilane, diphenyldiethoxysilane, 3,3,3-trifluoropropylmethyldimetoxysilane, 3,3,4,4,5,5,6,6,7,7,8,8,8-tridecafluorooctylmethyldimetoxysilane or 3,3,4,4,5,5,6,6,7,7,8,8,9,9,10,10,10-heptadecafluorodecylmethyldimethoxysilane;

tri- or tetra-alkoxysilanes such as γ-aminopropyltrimethoxysilane, γ-aminopropyltriethoxysilane, N-(β-aminoethyl)-γ-aminopropyltrimethoxysilane, N-(β-aminoethyl)-γ-aminopropyltriethoxysilane, γ-mercaptopropyltrimethoxysilane, γ-glycidyloxypropyltrimethoxysilane, γ-glycidyloxypropyltriethoxysilane, γ-methacryloyloxypropyltrimethoxysilane, γ-chloropropyltrimetoxysilane, methyltriethoxysilane, phenyltrimethoxysilane, phenyltriethoxysilane, 3,3,3-trifluoropropyltrimetoxysilane, 3,3,4,4,5,5,6,6,7,7,8,8,8-tridecafluorooctyltrimethoxysilane, 3,3,4,4,5,5,6,6,7,7,8,8,9,9,10,10,10-heptadecafluorodecyltrimethoxysilane, tetramethoxysilane or tetraethoxysilane;

An aromatic amine type silane coupling agent which is a silane coupling agent having an aromatic amine structure (When the silane coupling agent is used, it is found that neither gelation nor thickening is likely to occur even in the case of a trialkoxy compound. When the silane coupling agent is used, a structure without an alkyl group having 2 or more carbon atoms and an alkylene structure can be formed after the condensation reaction of alkoxysilane. Therefore, the heat resistance can be improved).

A preferable example of the aromatic amine type silane coupling agent includes a compound represented by a general formula of $ArSi(OR^1)(OR^2)(OR^3)$, $ArSiR^4(OR^1)(OR^2)$, or $ArSiR^4R^5(OR^1)$ [where, $R^1$ to $R^5$ independently represent hydrogen atoms, alkyl group or aryl group having 1 to 20 carbon atoms, Ar represents p-, m- or o-aminophenyl group]. Specific examples thereof are as follows:

aminophenyltrimethoxysilane, aminophenyltriethoxysilane, aminophenyltripropoxysilane, aminophenyltriisopropoxysilane, aminophenylmethyldimethoxysilane, aminophenylmethyldiethoxysilane, aminophenylmethyldipropoxysilane, aminophenylmethyldiisopropoxysilane, aminophenylphenyldimethoxysilane, aminophenylphenyldiethoxysilane, aminophenylphenyldipropoxysilane, and aminophenylphenyldiisopropoxysilane.

A hydrogen atom of an amino group may be substituted by an alkyl group or an aryl group.
Examples thereof include N, N-dimethylaminophenyltrialkoxysilane and N,N-dimethylaminophenylmethyldialkoxysilane. In addition to these, an aromatic amine type silane coupling agent described in U.S. Pat. No. 3,481,815, for example, may be used.

These silane coupling agents may be used alone or in combination. It is also preferable to use partial cohydrolysates thereof. Further, it is also preferable to use partial cohydrolysate of the above-described silane coupling agents and tetraalkoxysilane such as tetramethoxy silane, tetraethoxysilane or tetrapropoxysilane. Among them, particularly preferable examples of silane coupling agents which can improve adhesive properties of the fluorine-containing polymer without impairing the transparency of the fluorine-containing polymer include: silane coupling agents having an amino group (e.g. γ-aminopropyltriethoxysilane, γ-aminopropylmethyldiethoxysilane, γ-aminopropyltrimethoxysilane, γ-aminopropylmethyldimethoxysilane, N-(β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, N-(β-aminoethyl)-γ-aminopropylmethyldiethoxysilane, aminophenyltrimethoxysilane, aminophenyltriethoxysilane, aminophenylmethyldimethoxysilane, and aminophenylmethyldiethoxysilane) and silane coupling agents having an epoxy group (e.g. γ-glycidyloxypropyltrimethoxysilane, γ-glycidyloxypropylmethyldimethoxysilane, γ-glycidyloxypropyltriethoxysilane, and γ-glycidyloxypropylmethyldiethoxysilane). The silane coupling agent having an amino group is more preferable.

In particular, alkoxysilanes having an amino group or an epoxy group is effective for a fluorine-containing polymer in which a carboxy group is previously introduced into a main chain end or a side chain. In particular, alkoxysilanes having an amino group or an aminophenyl group is effective for a fluorine-containing polymer in which an ester group is previously introduced into a main chain end or a side chain.

In the aprotic fluorine-containing solvent, trialkoxysilanes having an amino group or an epoxy group are more likely to increase the viscosity of the liquid composition of the exemplary embodiment over time and to gelate the same as compared to dialkoxysilanes having the same groups. Further, the solubility of trialkoxysilanes to the fluorine-containing polymer solution with aprotic fluorine-containing solvent is lower than that of dialkoxysilanes. Therefore, when trialkoxysilanes are used, it is preferable to add a protic fluorine-containing solvent, particularly the fluorine-containing alcohol.

In the case of dialkoxysilanes, the solubility is not so low as that in the case of trialkoxysilanes. However, the solubility can be improved by adding a protic fluorine-containing solvent, particularly the fluorine-containing alcohol in the same manner as described above. In the case of dialkoxysilanes, a temporal increase in the viscosity of the liquid composition is not so significant as the case of trialkoxysilanes. Thus, the protic fluorine-containing solvent such as the fluorine-containing alcohol does not have to be added. However, the increase in viscosity can be reliably suppressed when it is added.

As described above, when the protic fluorine-containing solvent is added to the fluorine-containing polymer solution, the solubility of the silane coupling agent in the fluorine-containing polymer solution can be increased. Further, an increase in viscosity and gelation which are considered due to the reaction between the silane coupling agents can be suppressed. Examples of the protic fluorine-containing solvent include the followings:

fluorine-containing alcohols such as trifluoroethanol, 2,2,3,3,3-pentafluoro-1-propanol, 2-(perfluorobutyl)ethanol, 2-(perfluorohexyl)ethanol, 2-(perfluorooctyl)ethanol, 2-(perfluorodecyl)ethanol, 2-(perfluoro-3-methylbutyl)ethanol, 1H,1H,3H-tetrafluoro-1-propanol, 1H,1H,5H-octafluoro-1-pentanol, 1H,1H,7H-dodecafluoro-1-heptanol, 1H,1H,9H-hexadecafluoro-1-nonanol, 2H-hexafluoro-2-propanol and 1H,1H,3H-hexafluoro-2-butanol;

fluorine-containing carboxylic acids such as trifluoroacetic acid, perfluoropropanoic acid, perfluorobutanoic acid, perfluoropentanoic acid, perfluorohexanoic acid, perfluoroheptanoic acid, perfluorooctanoic acid, perfluorononanoic acid, perfluorodecanoic acid, 3H-tetrafluoropropanoic acid, 5H-octafluoropentanoic acid, 7H-dodecafluoroheptanoic acid and 9H-hexadecafluorononanoic acid; amides of the fluorine-containing carboxylic acids; and fluorine-containing sulfonic acids such as trifluoromethanesulfonic acid and heptadecafluorooctanesulfonic acid.

These protic fluorine-containing solvents may be used alone or as a mixture of two or more thereof.

The concentration of the fluorine-containing polymer in a mixture of the aprotic fluorine-containing solvent and the protic fluorine-containing solvent is usually 0.1 to 30% by weight, preferably 0.5 to 20% by weight. The blending amount of the silane coupling agent is 0.01 to 50 parts by weight, preferably 0.1 to 30 parts by weight per 100 parts by weight of the fluorine-containing polymer. The blending amount of the protic fluorine-containing solvent in the mixture of the aprotic fluorine-containing solvent and the protic fluorine-containing solvent is 0.01 to 50% by weight, preferably 0.1 to 30% by weight.

Although the exemplary embodiment of the invention has been described above, many changes and modifications will become apparent to those skilled in the art in view of the foregoing description which is intended to be illustrative and not limiting of the invention defined in the appended claims.

EXAMPLES

Hereinafter, specific examples of the above-described embodiments will be described. However, the present invention is not limited thereto.

Example 1

An electret according to the present example was produced in the following process.
(1) Production of fluorine-containing polymer composition for coating.

Perfluoropolybutenylvinylether was dissolved in perfluorotributylamine at a concentration of 13% and a polymer solution B was obtained. The infrared absorption spectrum of the compression-molding film of the polymer dissolved in the polymer solution B was measured. As a result, characteristic absorption derived from —COOH at 1775 and 1810 $cm^{-1}$ was observed. Further, the intrinsic viscosity [η] of the polymer dissolved which was measured with a perfluoro(2-butyltetrahydrofuran) solution was 0.23.

In this regard, perfluoropolybutenylvinylether is produced by cyclopolymerizing perfluorobutenylvinylether ($CF_2$=$CFOCF_2CF_2CF$=$CF_2$) using diisopropylperoxidicarbonate ((($CH_3)_2CHOCOO)_2$) as a polymerization initiator, heat-treating an unstable end derived from the initiator to form —COF, and then hydrolyzing it to form —COOH.

(2) Production of mixture with silane coupling agent 4.7 g of 2-(perfluorohexyl)ethanol and 10.6 g of perfluorotributylamine were added to 84.6 g of the polymer solution B and further 0.4 g of γ-aminopropylmethyldiethoxysilane was added thereto, which was mixed and a uniform polymer solution A was obtained.

4.7 g of 2-(perfluorohexyl)ethanol and 10.6 g of perfluorotributylamine were added to 84.6 g of the polymer solution B and further 0.4 g γ-aminopropyltriethoxysilane was added thereto, which was mixed and a uniform polymer solution C was obtained.

Further, 0.4 g of N-(β-aminoethyl)-γ-aminopropyltriethoxysilane was added to 84.6 g of the polymer solution B, which was mixed and a uniform polymer solution D was obtained.

(3) A series of stacked film forming operations of spin-coating the polymer solution A on a copper substrate of 3 cm square and 350 μm thick under the condition at 1,000 rpm for 20 seconds and pre-baking at 100° C. for 10 minutes, followed by spin-coating under the condition at 1,080 rpm for 20 seconds and pre-baking at 100° C. for 10 minutes was repeated twice, followed by post-baking at 100° C. for 1 hour and at 200° C. for 1 hour and a coating film having a thickness of 15 μm was obtained. Charges were injected into the coating films in the same manner as described in Example 2 and an electret A was obtained.

Further, coating films having a thickness of 15 μm were obtained by repeating the series of stacked film forming operations including spin-coating, pre-baking, spin-coating, and pre-baking twice and then post-baking in the same manner as described above except that the polymer solution C and the polymer solution D were used, respectively. Charges were injected into these coating films in the same manner as described in Example 2 and electrets C and D were obtained, respectively.

Comparative Example 1

As a comparative example, an electret was produced in the following process.

(1) A series of stacked film forming operations of spin-coating the polymer solution B on a copper substrate of 3 cm square and 350 μm thick under the condition at 1,000 rpm for 20 seconds and pre-baking at 100° C. for 10 minutes, followed by spin-coating under the condition at 1,850 rpm for 20 seconds and pre-baking at 100° C. for 10 minutes was repeated twice, followed by post-baking at 100° C. for 1 hour and at 200° C. for 1 hour at the end of the process and a coating film having a thickness of 15 μm was obtained. Charges were injected into the coating film in the same manner as described in Example 2 and an electret B was obtained.

Example 2

The loading test of the electrets A, B, C, and D was performed in the following process.

FIG. 1 shows a schematic diagram of a corona charging apparatus used in the loading test. As shown in FIG. 1, charges were injected into films formed by coating the polymer solutions A, B, C, and D, respectively, on a copper substrate (base electrode) 10 by corona discharge to obtain the electrets A, B, C, and D. The injection of charges was performed by using the copper substrate 10 as an electrode and applying a high voltage of −8 kV between a corona needle 14 and the copper substrate 10 from a high-voltage DC power supply 12 (HAR-20R5: manufactured by Matsusada Precision). Negative ions discharged from the corona needle 14 were equalized by a grid 16 and then poured onto the coating film and charges were injected. In this process, a voltage of −600 V was applied to the grid 16 from a power source 18 for the grid. Further, the coating film is heated to a glass transition temperature (Tg) or higher with a hot plate 19 to stabilize the charges injected.

Figure 2:
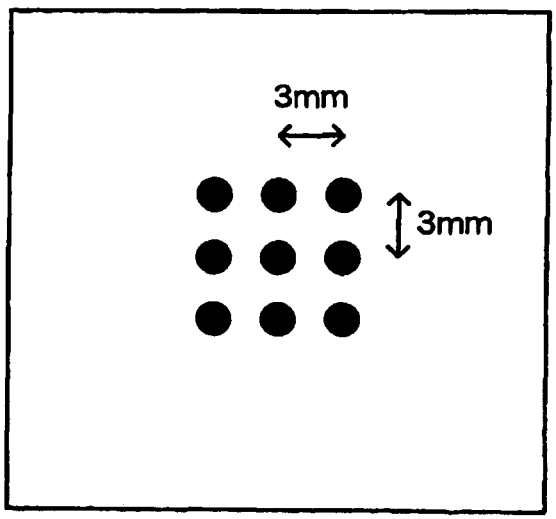
FIG. 2 is a diagram illustrating an example of setting of points of measurement of surface potentials.

In the present example, samples of respective coating films were corona-charged in atmospheric air, under the condition at the temperature of 120° C., at the electric charge voltage of −8 kV, and for the loading duration of 3 minutes. Thereafter, the temperature of the samples was returned to an ordinary temperature. The surface potentials at 9 points in a reticular pattern every 3 mm from the center of the film were measured using a surface potential meter (model 279; manufactured by Monroe Electronics) and the average thereof was calculated. An example of 9 points of measurement set is shown in FIG. 2.

Further, samples of the respective coating films were kept under the condition of 20° C. and 65% RH (relative humidity) and the potential measurement was performed over time up to 2500 hours.

Figure 3:
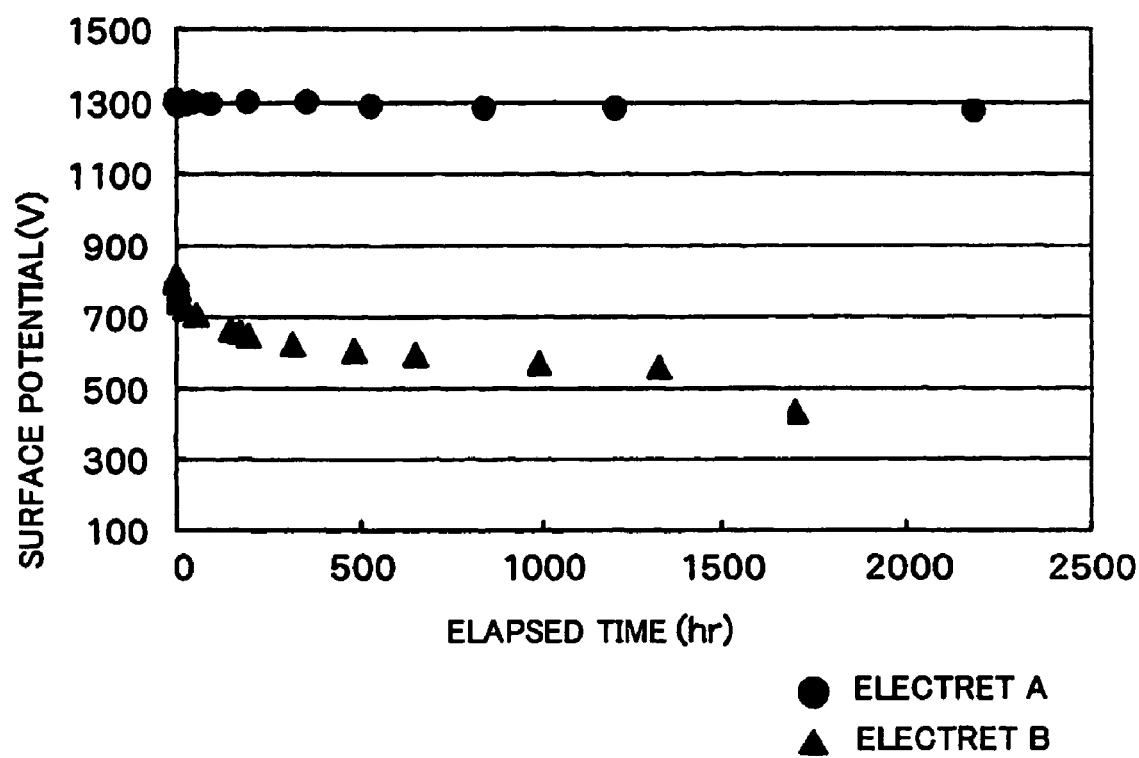
FIG. 3 is a graph illustrating temporal changes of charges held by electrets A and B.

FIG. 3 shows temporal changes of charges held by each of the coating films (the electrets A and B). In FIG. 3, a horizontal axis represents an elapsed time and a vertical axis represents a surface potential. The surface potential is higher as the density of charges held by the electrets is higher.

As is apparent from FIG. 3, both the electric charge density and the temporal stability of the electret A in which aminosilane was mixed were greatly improved as compared to those of the electret B of Comparative example in which aminosilane was not mixed.

Figure 4:
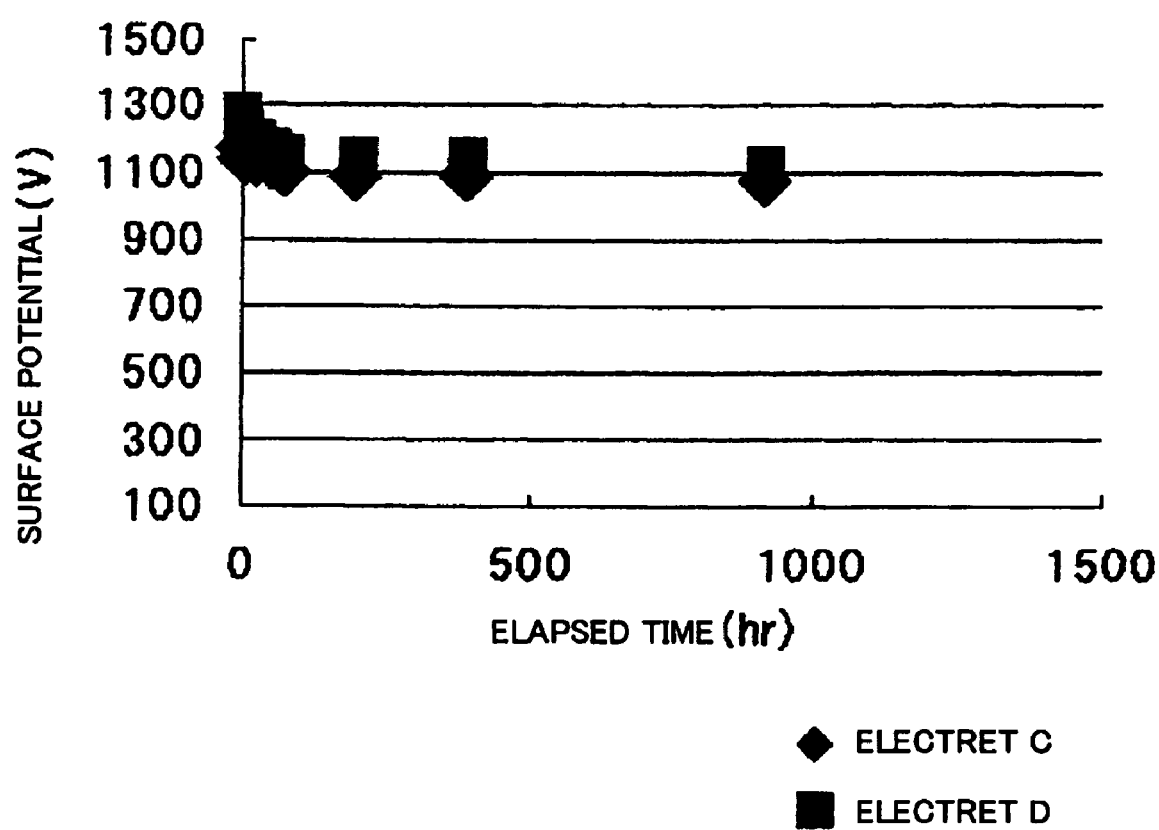
FIG. 4 is a graph illustrating temporal changes of charges held by electrets C and D.

Similarly, as is apparent from FIG. 4, both the electric charge density and the temporal stability of the electrets C and D were greatly improved.

Table 1 shows values of the surface potentials for the respective electrets when the values became almost constant after temporal change. As is apparent from Table 1, surface potentials after the temporal change of all of the electrets A, C, and D are higher than that of the electret B.

[Table 1]

|  | Electret A | Electret B | Electret C | Electret D |
| --- | --- | --- | --- | --- |
| Surface potential (V) | 1240 | 490 | 1070 | 1120 |
| Elapsed time (hr) | 1200 | 1300 | 900 | 900 |

Example 3

The electrets A, B, and C and D were subjected to the thermal stability test in the following process.

Figure 5:
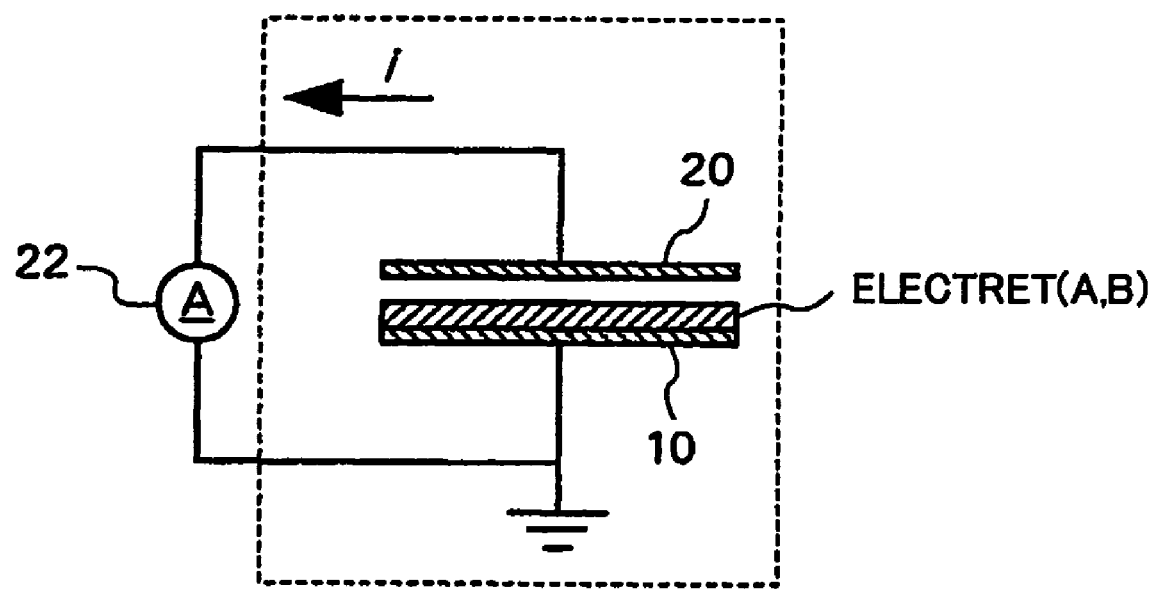
FIG. 5 is a schematic diagram of an apparatus used in a thermal stability test.

FIG. 5 shows a schematic diagram of an apparatus used in the thermal stability test. As shown in FIG. 5, a counter electrode 20 was placed opposed to electrets A and B formed by injecting charges into the films formed by coating the polymer solutions A and B on the copper substrate 10 by corona discharge. As a result, a capacitor was formed of each of the electrets A and B and the counter electrode 20. When each of the electrets A and B is heated, charges trapped in the film become unstable, and charges near the surface disappear by diffusion and the like, thereby charges stored in the counter electrode 2 also decrease. Accordingly, the thermal stability of each of the electrets A and B can be measured by the magnitude of the current value which flows from the counter electrode 20.

Therefore, while the temperature of a portion indicated by a dashed line in FIG. 5 was increased at a constant speed (1° C./min), the charge amount discharged from each of the electrets A and B was measured as a current value i flowing from the counter electrode 20 with an ammeter 22. In this measurement, a microammeter (Model 6517A; manufactured by Keithley) was used for the ammeter 22.

Figure 6:
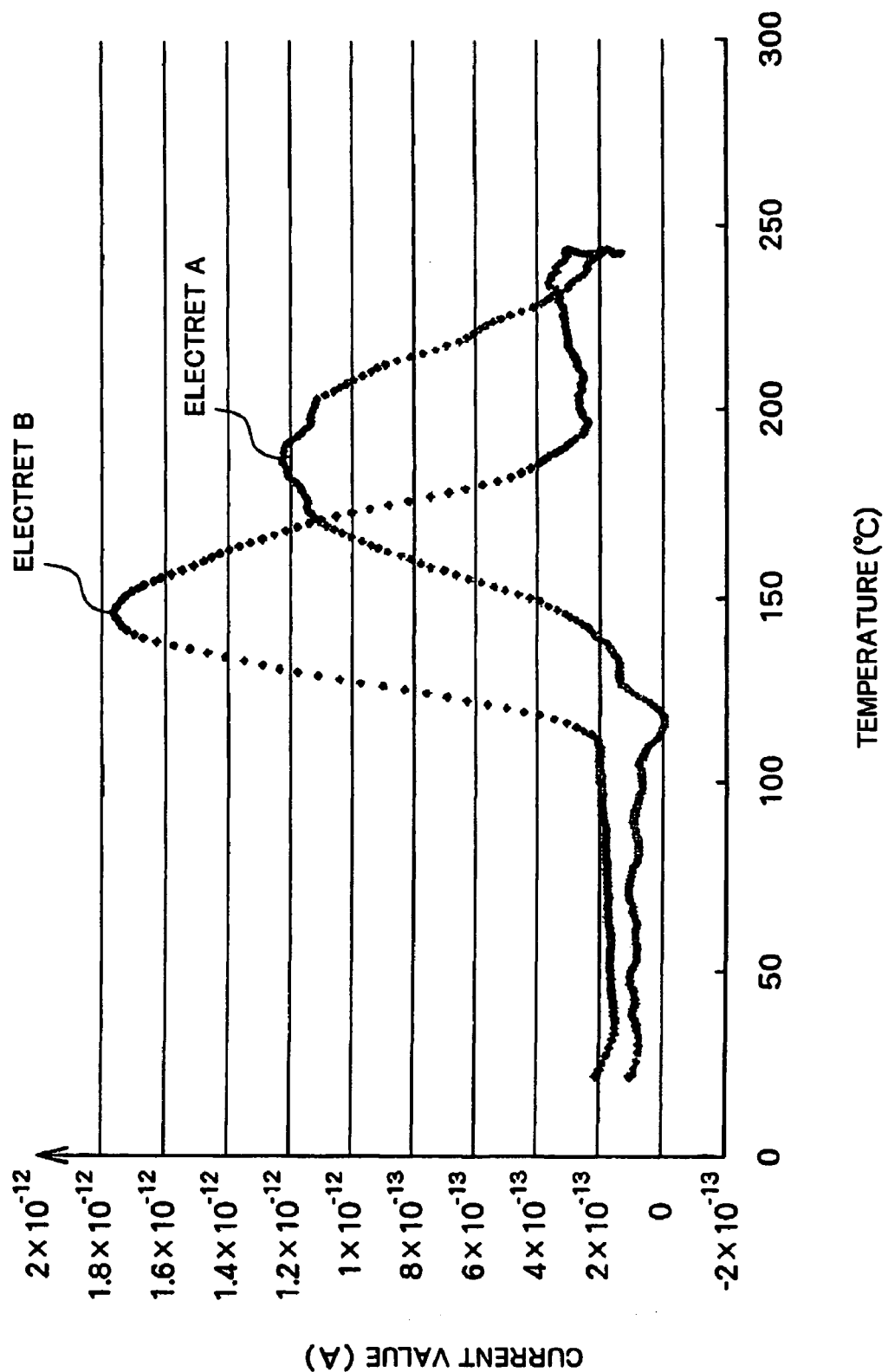
FIG. 6 is a graph illustrating results of the thermal stability test for the electrets A and B.

FIG. 6 shows the results of the thermal stability test for each of the electrets A and B which was performed with the apparatus of FIG. 5. As is apparent from FIG. 6, the thermal stability of the electret A in which aminosilane was mixed was improved as compared to that of the electret B of Comparative example in which aminosilane was not mixed. The temperature at the peak position of the electret A (185° C.) is higher than the temperature at the peak position of the electret B (145° C.), which shows that the thermal stability of the electret A is high.

The thermal stability test for the electrets C and D was performed with the apparatus of FIG. 5 in the same manner as described above. The temperatures at the peak positions of the electrets C and D are 176° C. and 168° C., respectively, which shows that the electrets C and D are excellent in heat resistance as compared to the electret B. Table 2 shows the temperature at the peak position of each of the electrets.

[Table 2]

|  | Electret A | Electret B | Electret C | Electret D |
|---|---|---|---|---|
| TSD peak top temperature (° C.) | 185 | 145 | 176 | 168 |

Example 4

Vibration Generation Test

Figure 7:
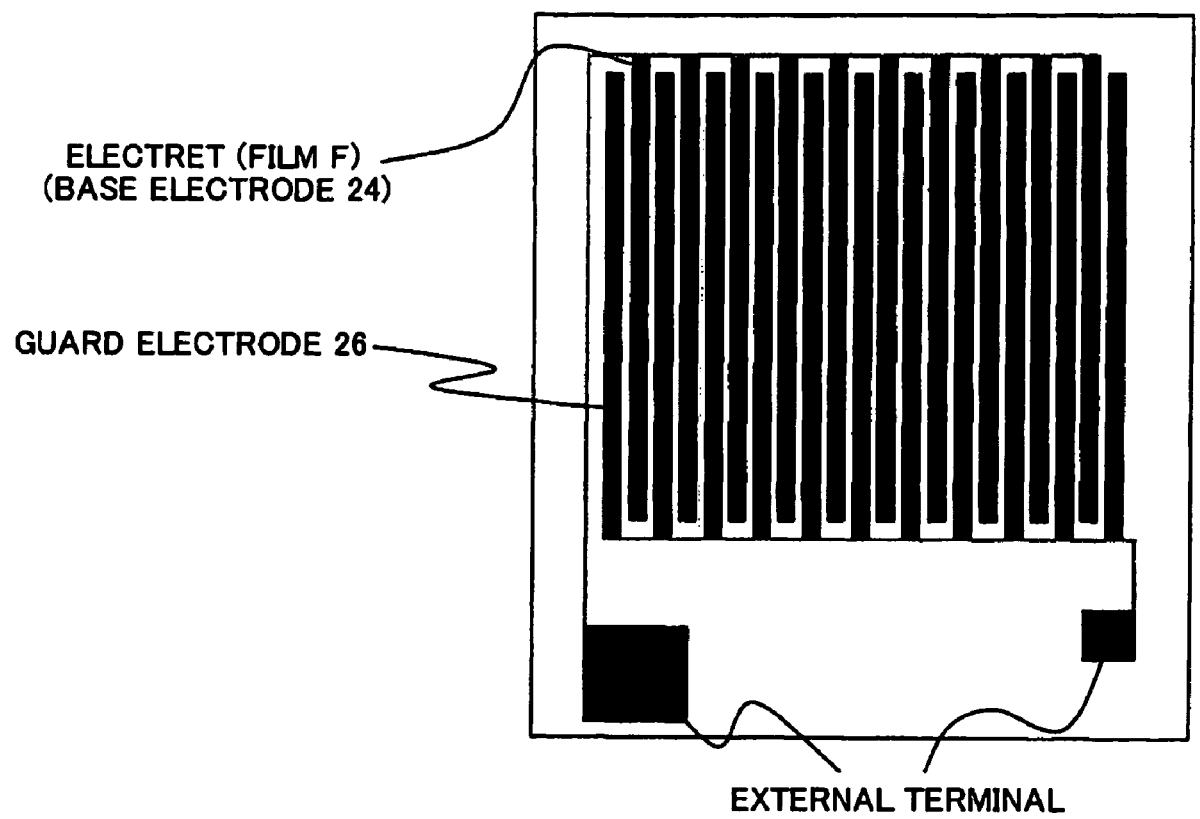
FIG. 7 is a diagram illustrating patterned electrodes.

An electrode was formed on a glass substrate 28 made of Pyrex (registered trademark) having a thickness of 0.7 mm by vapor deposition in order of Cr/Au/Cr (thickness: 50/200/50 nm), followed by patterning by photolithography as shown in FIG. 7. The pattern of the electrode includes a base electrode 24 (width: 150 µm, pitch: 300 µm) which forms an electret on the upper surface and a guard electrode 26. A series of stacked film forming operations of spin-coating the polymer solution A under the condition at 1,000 rpm for 20 seconds and pre-baking at 100° C. for 10 minutes, followed by spin-coating under the condition at 1,080 rpm for 20 seconds and pre-baking at 100° C. for 10 minutes was repeated twice, followed by post-baking at 100° C. for 1 hour and at 200° C. for 1 hour and a coating film (film A) having a thickness of 16 µm was obtained.

Subsequently, Cu was vapor-deposited on the film A and patterned by photolithography, which was used as a metal mask. The film A was subjected to dry etching using $O_2$ plasma at an RF power of 100 W for 60 to 70 minutes. A polymer A coating film (film E) which only on the surface of the base electrode 24 was patterned was obtained by the above process. The film E was subjected to corona discharge treatment in the same manner as described in Example 2 and an electret film (film F) having a surface potential of −640 V was obtained.

Figure 8:
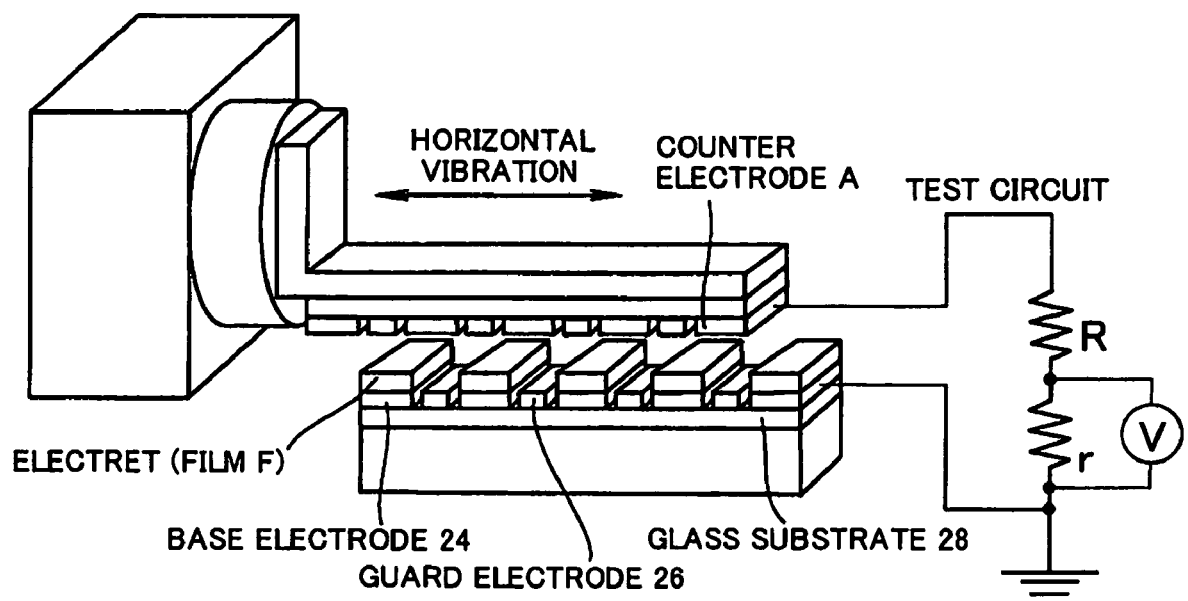
FIG. 8 is a schematic diagram of an apparatus for vibration generation test.

A patterned Cr/Au/Cr electrode (counter electrode A) was formed on a glass substrate made of Pyrex having a thickness of 0.7 µm by the same process as described above. As shown in FIG. 8, the film F and the counter electrode A were placed at intervals of 30 µm. By fixing the film F and horizontally vibrating the counter electrode A in a direction of an arrow in FIG. 8 at 20 Hz with a width of 1.2 mm, an electric generating power up to 0.698 mW was obtained.

The invention claimed is:

1. An electret comprising:
   a mixture of a fluorine-containing polymer having a carboxyl group in an end of its main chain or in its side chain and a ring structure in its main chain, and a silane coupling agent having an amino group or an epoxy group; or
   a mixture of a fluorine-containing polymer having an ester group in an end of its main chain or in its side chain and a ring structure in its main chain, and a silane coupling agent having an amino group or an aminophenyl group.

2. The electret according to claim 1, wherein the fluorine-containing polymer having a ring structure in its main chain includes a carboxyl group as an end group.

3. The electret according to claim 1, wherein the silane coupling agent is a silane compound, and the silane coupling agent is bonded to the carboxyl group of the fluorine-containing polymer.

4. The electret according to claim 1, wherein the fluorine-containing polymer having a ring structure in its main chain is a fluorine-containing aliphatic polymer having a ring structure in its main chain.

5. The electret according to claim 1, wherein the fluorine-containing polymer having a ring structure in its main chain is a fluorine-containing aliphatic polymer having a ring structure including an ethereal oxygen atom in its main chain.

6. An electrostatic induction conversion device comprising the electret according to claim 1.

7. An electrostatic induction conversion device comprising the electret according to claim 2.

8. An electrostatic induction conversion device comprising the electret according to claim 3.

9. An electrostatic induction conversion device comprising the electret according to claim 4.

10. An electrostatic induction conversion device comprising the electret according to claim 5.

* * * * *